United States Patent
Young et al.

(10) Patent No.: US 8,009,508 B2
(45) Date of Patent: Aug. 30, 2011

(54) ULTRASONIC GENERATOR SYSTEM

(75) Inventors: Michael John Radley Young, South Devon (GB); Stephen Michael Radley Young, South Devon (GB)

(73) Assignee: SRA Developments Limited (GB)

( * ) Notice: Subject to any disclaimer, the term of this patent is extended or adjusted under 35 U.S.C. 154(b) by 666 days.

(21) Appl. No.: 11/658,131

(22) PCT Filed: Jul. 18, 2005

(86) PCT No.: PCT/GB2005/002814
§ 371 (c)(1),
(2), (4) Date: Sep. 2, 2008

(87) PCT Pub. No.: WO2006/008502
PCT Pub. Date: Jan. 26, 2006

(65) Prior Publication Data
US 2008/0316865 A1    Dec. 25, 2008

(30) Foreign Application Priority Data
Jul. 20, 2004   (GB) ................... 0416160.0

(51) Int. Cl.
*B06B 1/02* (2006.01)
(52) U.S. Cl. ............................................. 367/13
(58) Field of Classification Search .......... 367/13, 367/138
See application file for complete search history.

(56) References Cited

U.S. PATENT DOCUMENTS

| | | | |
|---|---|---|---|
| 4,577,500 A | 3/1986 | Mishiro et al. | |
| 4,882,525 A | 11/1989 | Cordemans De Meulenaer et al. | |
| 4,973,876 A | 11/1990 | Roberts et al. | |
| 5,001,649 A | 3/1991 | Lo et al. | |
| 5,637,947 A | 6/1997 | Kising et al. | |
| 5,897,495 A | 4/1999 | Aida et al. | |
| 2008/0316865 A1* | 12/2008 | Young et al. ................. | 367/140 |

FOREIGN PATENT DOCUMENTS

| EP | 1 199 044 A | 4/2002 |
|---|---|---|
| EP | 1 199 044 B1 | 12/2005 |
| JP | 2001 212514 A | 8/2001 |

* cited by examiner

*Primary Examiner* — Dan Pihulic
(74) *Attorney, Agent, or Firm* — Carter, DeLuca, Farrell & Schmidt, LLP

(57) ABSTRACT

The system generates resonant ultrasonic vibrations, preferably in a torsional mode. A control circuit monitors, feedback signals therefrom, which are scanned to determine the frequency at which minima occur. The frequency of the ultrasonic signal is then adjusted to the frequency at which the minimum occurs.

15 Claims, 2 Drawing Sheets

ULTRASONIC GENERATOR SYSTEM

Figure 1:
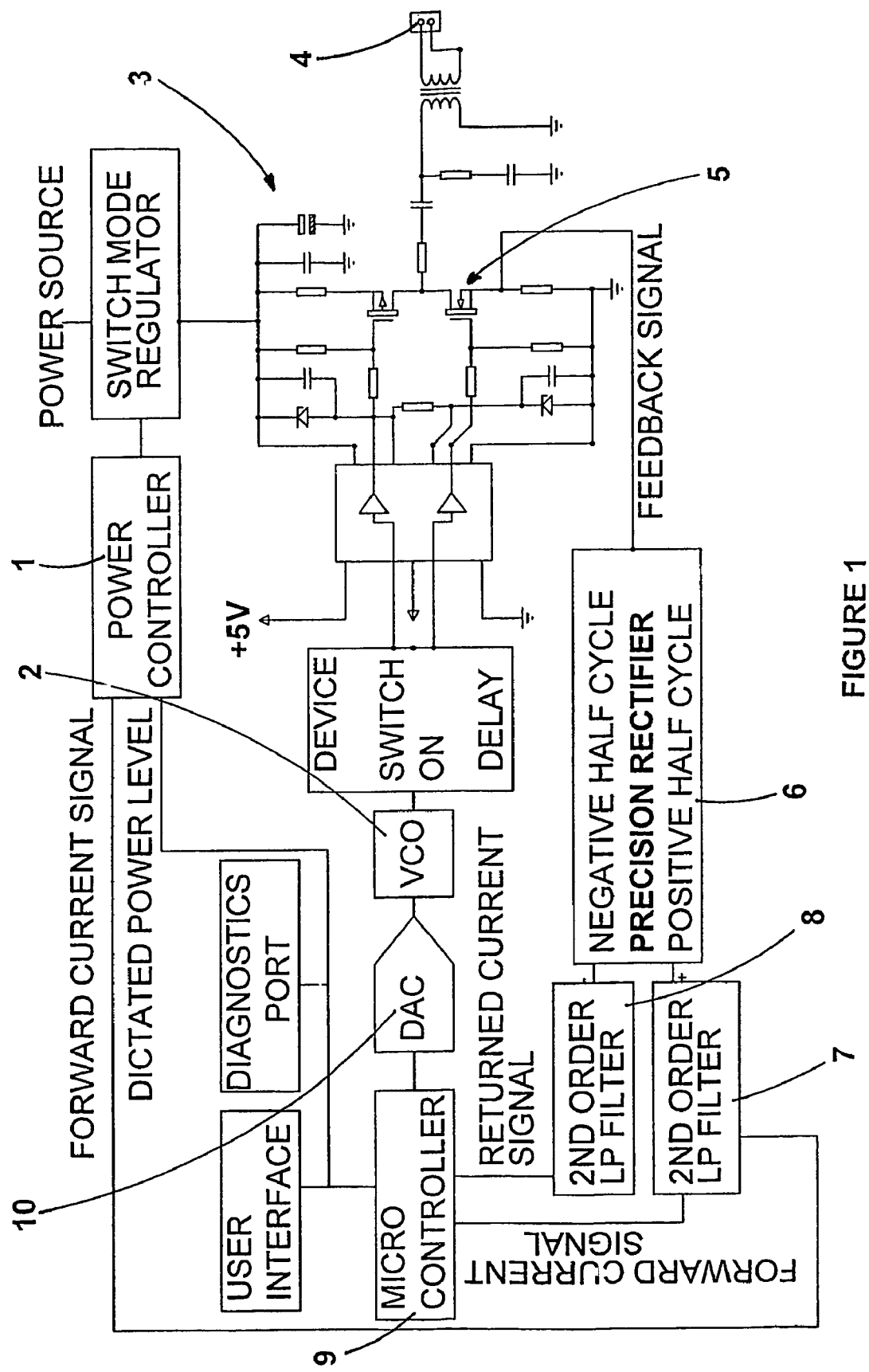

The present invention relates to an ultrasonic generator system. More particularly, but not exclusively, it relates to a generator system able to achieve and maintain a resonant torsional frequency to be applied to a waveguide.

A torsional waveguide has a large number of natural frequencies, only a few of which are useful. The majority of resonant conditions are in a flexural mode, which is not desirable.

Ideally, a conventional drive circuit could power an elongate thin torsionally vibratable waveguide. However, there are difficulties where it is desired to use a unique torsional mode resonance as this would need to be separated by a frequency difference of at least 1.0 kHz from any alternative resonant modes for a conventional circuit to suffice. In practice, such waveguides display alternative resonant modes within a few hundred Hz of a desired mode.

It is known from European Patent Application No. 1025806A to provide an ultrasonic surgical device in which the circuitry stores a frequency for a resonant condition and restores the signal to that condition whenever it detects a non-resonant condition.

This is not ideally suited to torsional vibration modes.

It is also known from our co-pending UK Application No 2382943 to provide a generator system to select a desired resonance mode.

However, such systems do not always have the flexibility to cope with instantaneous changes in operating parameters during the course of an operation.

It is an object of the present invention to provide an improved frequency generating control circuit.

It is a further object to provide a system for use in surgical procedures which indicates when an end point of the procedure is approaching.

According to a first aspect of the present invention, there is provided a method of generating a resonant ultrasonic signal comprising the steps of generating an ultrasonic signal, monitoring feedback signals therefrom, carrying out a scan of the feedback signal, determining the frequency at which minima occur and adjusting the frequency of said ultrasonic signal to said frequency at which the minimum occurs.

According to a second aspect of the present invention, there is provided a method of determining the progress of an ultrasonically powered operation comprising the steps of generating an ultrasonic signal, taking regular readings of feedback therefrom and monitoring the waveform of said feedback signal for change therein indicative of an end-point of the operation.

Preferably, the change comprises a variation in amplitude of said waveform.

According to a third aspect of the present invention, there is provided an ultrasonic generator system comprising means to generate ultrasonic vibrations and control circuit means therefor adapted to perform the method as described in the first and/or second aspects above.

Preferably, the system comprises waveguide means for said ultrasonic vibrations, operatively connected to said generating means.

Advantageously, the system comprises alerting means to signal errors in operation of the system to a user.

Optionally, the alerting means may comprise display means, such as liquid crystal display means.

Alternatively or additionally, the alerting means may comprise audible alerting means.

Preferably, said ultrasonic vibrations are vibrations in a torsional mode.

Figure 2:
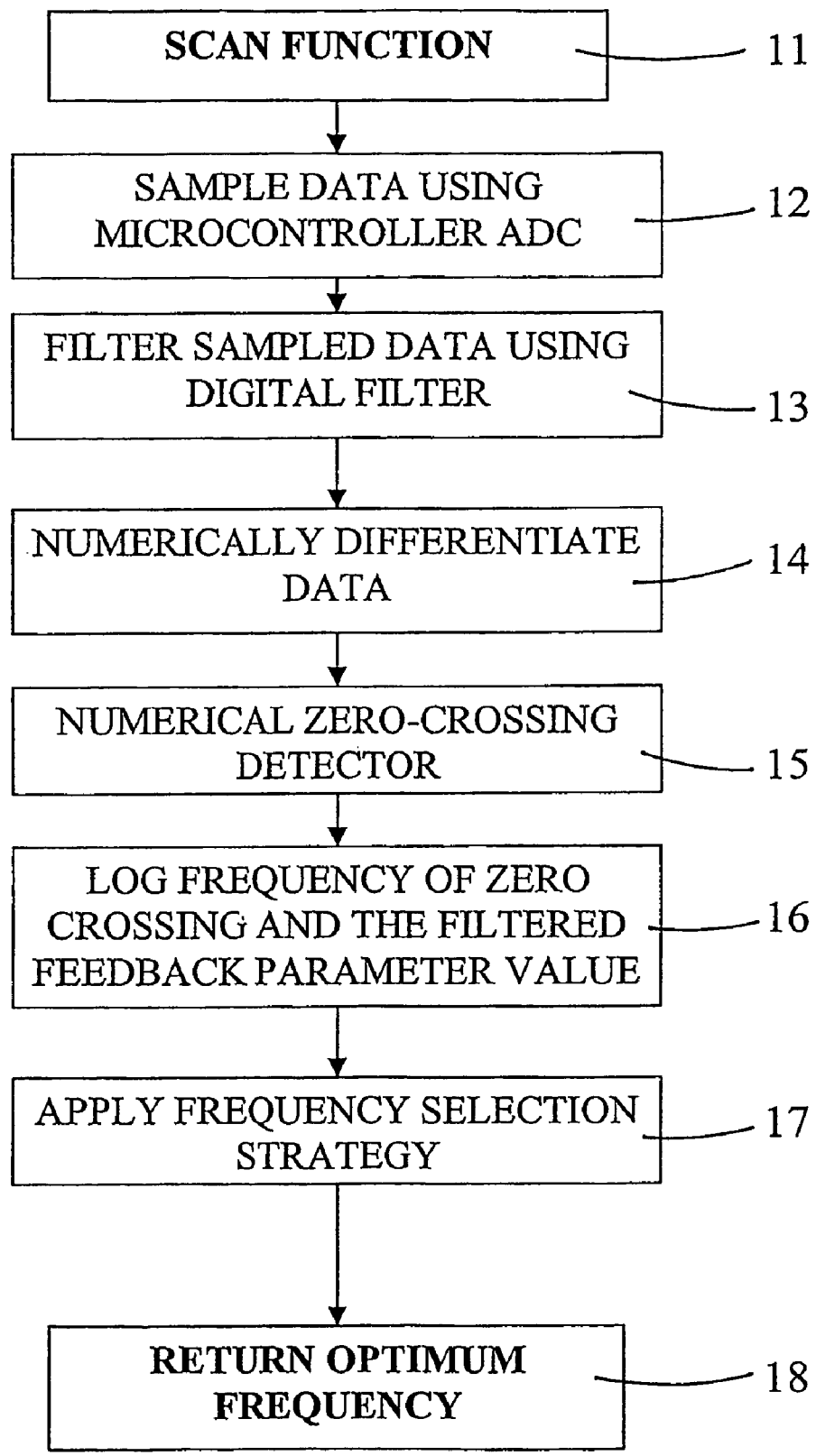

An embodiment of the present invention will now be more particularly described with reference to the accompanying drawings, in which:

FIG. 1 shows schematically a circuit diagram of a control structure embodying the invention; and FIG. 2 shows schematically a flow chart of the system.

When the ultrasonic transducer of an ultrasonic surgical tool or the like is perfectly matched to its ultrasonic generator, all the available power is delivered to the transducer, and the tool should work at optimum efficiency. However, this is not always the situation in practice.

A waveguide of an ultrasonic tool has a large number of natural resonant frequencies, but these are in both flexural and torsional vibrational modes. Only a few of these resonances couple well with the substrate (e.g. body tissues) on which the tool is working, and hence transfer a useful amount of energy to the substrate. The exact resonances of a system comprising a tool engaged with its substrate may well differ from those of the tool in isolation. The position of the resonance may change as the substrate changes under the action of the tool (e.g. as a coagulating tool solidifies body fluids within the tissues being acted upon). The amplitude of a resonance can vary, as well as its position.

As well as changes due to the applied load, the frequency of a resonance may also drift as a result of thermal effects.

Thus, if the transducer is not ideally matched or tuned at its optimum frequency, some of the power from the generator is reflected by the transducer and returned to the generator. This reflected power alters the waveforms of the currents passing through the generator and associated control circuitry, and so the reflected power (or a parameter indicating the reflected power) can be used to track the transducer's optimum operating frequency at a particular instant, and to set (or re-set) the generator frequency accordingly by means of a digital frequency controller.

FIG. 1 shows a circuit for supplying power to an ultrasonic transducer, embodying this approach. Much of the circuit shown schematically is of conventional form. A power controller unit 1 controls the amplitude of the ultrasonic signal to be sent to the transducer, while a VCO 2 controls the frequency of the signal. An amplifier circuit 3 effectively combines the amplitude specified by the power controller 1 and the frequency set by the VCO 2 to produce a signal which is passed via an output 4 to the ultrasonic transducer (not shown).

To detect changes in this signal, caused by mismatch between the frequency generated and the optimum resonance frequency of the transducer under load at a particular instant, a feedback signal is extracted from the amplifier circuit 3. The most useful feedback signal is one representing the current flow through switching device Q3 5. This feedback signal can be separated into two components, positive and negative. The positive component represents forward current flowing out of the amplifier, while the negative component will be present when the load on the amplifier is reactive (i.e. the output signal and the transducer/tool/substrate resonance are not matched). The negative current may flow either through the Q3 switching device 5 while it is in its "on" state or through its internal freewheeling diode.

The feedback signal from adjacent is passed to a precision rectifier 6 which splits it into its positive and negative components. The positive component is then filtered by a first second order low pass filter 7, while the negative component is independently filtered by a second second-order low pass filter 8. The filtered positive component, representing the forward current signal, is then passed both to the power controller 1 and to a microcontroller 9. The filtered negative component, representing the returned current signal, is passed only to the microcontroller 9.

The microcontroller 9 regulates the operation of the system shown, being linked operatively both directly to the power controller 1 and via a digital analogue converter or DAC 10 to the VCO 2. It is provided with an internal analogue to digital converter, which samples digital data from each of the positive and negative components of the feedback signal. These digital data are analysed within the microcontroller 9, using a scan procedure or function in order to locate the resonance frequencies at any given stage and hence to tune the VCO 2 to an optimum frequency. The digital data are also used for diagnostic purposes such as detecting malfunctions in the transducer and/or tool.

The flow chart of the "scan function" procedure is shown in FIG. 2. To activate this process, at stage 11 the microcontroller 9 instructs the VCO 2 to ramp its generated frequency across a preselected frequency range within which the resonance frequency or frequencies are believed to lie.

The frequency is ramped in a series of small steps, and at each step the feedback signal is sampled and digitised as described above (stage 12).

The sampled data are then filtered once more, through a low pass digital filter, to reduce noise (stage 13).

Next, the filtered data are numerically differentiated (stage 14). This eliminates any gradient which may be present in the data, but most importantly, at a resonance, the returned current/negative component of the feedback signal will be at a minimum. Its first differential will thus be zero at each frequency corresponding to a resonance.

In the next stage 15, to distinguish minima from maxima, at which the first differential is also zero, those frequencies are selected at which the differentiated data crosses zero in a positive direction (i.e. the second differential of the returned current is positive).

These selected frequencies are then logged (stage 16), together with a digitally filtered parameter value calculated at each selected frequency (this may for example be a simple measure of the depth and/or width of the minimum in question, or may be a more complex parameter).

From these selected resonance frequencies and their corresponding parameter values, a frequency selection strategy (stage 17) is applied to select the most suitable of the minima/resonances (assuming, of course, that more than one such frequency has been identified).

The optimum frequency thus selected is then passed via the DAC 10 to the VCO 2, as its new operating frequency (stage 18). The system then operates at this frequency for a preselected interval, after which the "scan function" is re-activated to check whether the optimum operating frequency for the transducer/tool/substrate combination has changed, and if so to set a new optimum operating frequency.

Thus, the tool will at all times operate at or very close to an ideal frequency for maximum energy transfer to the substrate.

A further function of the system shown is to regulate signal amplitude, particularly while the operation of the tool approaches completion. In each case, the characteristics of the feedback signal taken from the amplifier circuit 3 change significantly near an endpoint of the operation of a tool.

The microcontroller 9 uses the forward current/positive component of the feedback signal to measure the amplitude of the reflected or load current, and hence to detect that the endpoint of the operation is approaching. Using a digital control algorithm, it then instructs the power controller 1 to modify accordingly the DC voltage supply that it sends to the amplifier circuit 3.

The forward current/positive component of the feedback signal is also sent directly to the power controller 1, for example as a conventional feedback signal to ensure that the intended amplitude is being transmitted.

The system comprises a LCD (liquid crystal display), on which system status and error messages are displayed. For example, if the waveguide, which may be the handset of a surgical instrument, is not correctly connected to the system at start-up, the message "NO HANDSET" is displayed.

In some cases, surgical instrument handsets can become surface damaged if they contact bone, rather than soft tissues, which may alter the resonance modes of the waveguide. If such alteration is significant, it should be detected as an error. In this case, the generator would be halted and the message "REPLACE HANDSET" would be displayed on the LCD. The system also has an audible warning, such as a buzzer, to correspond to these LCD messages.

Generation of the signal may also be stopped in response to other error conditions, such as those noted by a discontinuous change in the frequency of the resonance mode.

The invention claimed is:

1. An ultrasonic generator system comprising means to generate ultrasonic vibrations and control circuit means therefor adapted to generate a resonant ultrasonic signal, means to monitor feedback signals from the control circuit means, means to scan the feedback signal, means to determine the frequency at which minima in said feedback signal occurs and means to adjust the frequency of said ultrasonic signal to said frequency, or selected one of the frequencies, at which the minimum occurs.

2. A system as claimed in claim 1, further comprising waveguide means for said ultrasonic vibrations, operatively connected to said generating means.

3. A system as claimed in claim 1 further comprising alerting means to signal errors in operation of the system to a user.

4. A system as claimed in claim 3, wherein the alerting means comprises display means, such as liquid crystal display means.

5. A system as claimed in claim 4, wherein the alerting means comprises audible alerting means.

6. A system as claimed in claim 1, wherein said ultrasonic vibrations are vibrations in a torsional mode.

7. A method of generating a resonant ultrasonic signal comprising the steps of:
providing means for generating an ultrasonic signal and control circuit means therefor,
generating an ultrasonic signal,
monitoring feedback signals from said control circuit means,
carrying out a scan of the feedback signal,
determining the or each frequency at which minima in said feedback frequency occurs, and
adjusting the frequency of said ultrasonic signal to said frequency, or selected one of the frequencies, at which the minimum occurs.

8. An ultrasonic generator system comprising means to generate ultrasonic vibrations and control circuit means therefor adapted to determine the progress of an ultrasonically powered operation comprising means to generate an ultrasonic signal, means to take regular readings of a feedback signal from said control circuit means and means to monitor the waveform of said feedback signal for change therein indicative of an end-point of the operation.

9. A system as claimed in claim 8, wherein the change comprises a variation in amplitude of said waveform.

10. A system as claimed in claim 8, further comprising waveguide means for said ultrasonic vibrations, operatively connected to said generating means.

11. A system as claimed in claim 10, further comprising alerting means to signal errors in operator of the system to a user.

12. A system as claimed in claim 11, wherein the alerting means comprises display means, such as liquid crystal display means.

13. A system as claimed in claim 12, wherein the alerting means comprises audible alerting means.

14. A system as claimed in claim 8, wherein said ultrasonic vibrations are vibrations in a torsional mode.

15. A method of determining the progress of an ultrasonically powered operation comprising the steps of:
- providing means for generating an ultrasonic signal and control circuit means therefor,
- generating an ultrasonic signal,
- taking regular readings of a feedback signal from the control circuit means, and
- monitoring the waveform of said feedback signal for change therein indicative of an end-point of the operation.

* * * * *